UNITED STATES PATENT OFFICE.

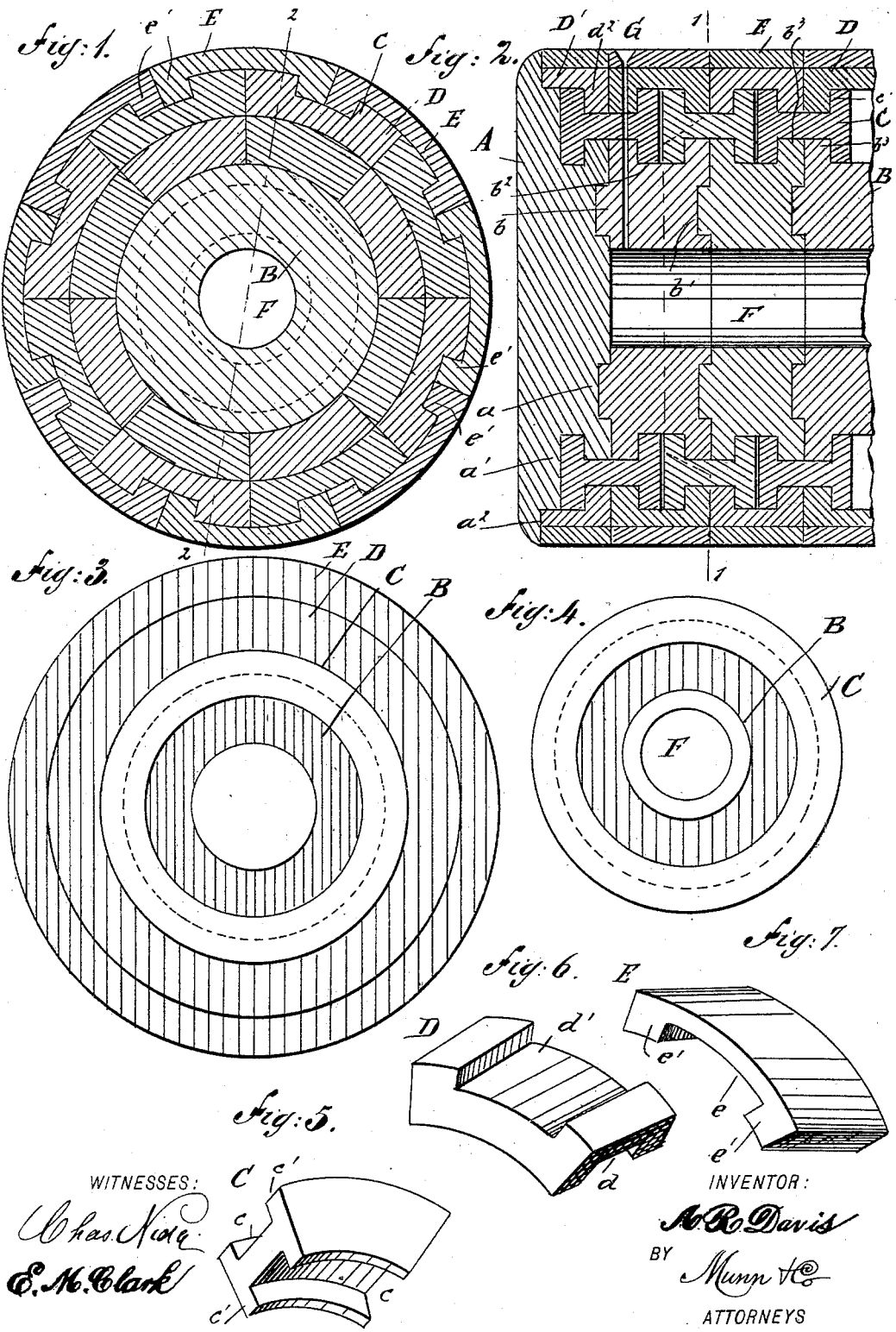

ALBERT R. DAVIS, OF ONEIDA, NEW YORK.

CANNON.

SPECIFICATION forming part of Letters Patent No. 456,800, dated July 28, 1891.

Application filed September 29, 1890. Serial No. 366,504. (No model.)

*To all whom it may concern:*

Be it known that I, ALBERT R. DAVIS, of Oneida, in the county of Madison and State of New York, have invented a new and Improved Cannon, of which the following is a full, clear, and exact description.

My invention relates to improvements in the construction of cannons; and the object of my invention is to produce a cannon which may be built up of a series of segments to any desired size, which may be made of unlimited strength and durability, and which may be comparatively cheaply and quickly built.

To this end my invention consists in certain features of construction and combinations of parts, which will be hereinafter fully described, and then pointed out in the claims.

Reference is to be had to the accompanying drawings, forming a part of this specification, in which similar letters of reference indicate corresponding parts in all the figures.

Figure 1 is a transverse section of the cannon embodying my invention on the line 1 1 of Fig. 2. Fig. 2 is a broken longitudinal section on the line 2 2 of Fig. 1. Fig. 3 is an end view looking into the muzzle of the cannon. Fig. 4 is a detail transverse view of the inner rings and connected gibs. Fig. 5 is an enlarged detail perspective view of one of the gibs for holding the inner rings in place. Fig. 6 is a detail perspective view of one of the plates which are laid next the gibs on the outside, and Fig. 7 is a detail perspective view of one of the outer plates.

The cannon is provided with a suitable breech-block A possessing the necessary strength, the size of the breech-block being governed by the size of the cannon to be constructed. The center of the cannon, in which is the bore, consists of a series of rings or segments B, said segments having on one side a lug $b$, on the opposite side a recess $b'$, corresponding in size to the size of the lug, and on the outside a slot or groove $b^2$, forming flanges $b^3$ on opposite edges of the segments. The lugs $b$ of the segments B, which are placed next the breech-block A, fit into a corresponding recess $a$ in the breech-block, and the lugs $b$ of each succeeding layer of segments fit into the recesses $b'$ of the abutting segments, as best shown in Fig. 2. The gibs C are segments of a circle, and a circle formed of the abutting gibs corresponds in size to the outer circumference of the inner rings or segments B. The gibs C have concentric slots $c$ on their outer and inner faces, as best shown in Fig. 5, and projecting flanges $c'$ are thus formed on opposite sides of the slots. Two abutting flanges $c'$ of the gibs will thus fit closely in the outer slot $b^2$ of the segments B, and the abutting flanges $b^3$ of the segments will fit closely in the inner slot $c$ of the gibs. The gibs C, which come next to the breech-block A, are firmly locked thereto, the breech-block having an annular recess $a'$, adapted to receive the flanges of the gibs. The next layer of the cannon is formed of the segmental plates D, which are of a size to fit closely upon the outer circumference of the gibs C, the said segmental plates having longitudinal slots $d$ on their inner surfaces, said slots being adapted to receive two abutting flanges $c'$ of the gibs C, and the gibs and segmental plates are thus securely locked together. The segmental plates are also provided on their outer surfaces with transverse slots $d'$, adapted to receive the flanges of the outer plates E.

A series of segmental plates D' are arranged parallel with the plates D and next the breech-block, said plates having flanges $d^2$, which fit in the outer slots $c$ of the gibs C, and the rear portion of the plates fit in a corresponding recess $a^2$ of the breech-block A. The outer surface of the cannon is formed of a series of plates E, which have transverse dovetailed grooves $e$ on their inner surfaces, thus forming flanges $e'$ at the ends of the plates. The outer surfaces of the plates E are smooth and plain, as shown, and the plates are adapted to be slid endwise upon the cannon, and the abutting flanges $e'$ are of a size for two of them to just fill the transverse slots $d'$ of the segmental plates D, and the segmental plates D' and the outer plates E will thus be locked together in such a manner as to resist all lateral strain.

When the parts of the cannon are put together, the bore F is formed within the inner rings composed of the segments B, and the cannon is provided with the usual touch-hole G, and to form it the necessary plates may be drilled before they are placed in position. When the cannon is constructed, the segments B are first placed in position, with the rear lugs $b$ projecting into the corresponding recess of the breech-block, and with the lugs of each succeeding layer of segments fitting the corresponding recesses $b'$ of the abutting segments, the gibs C are placed around the segments, with the flanges of the gibs and segments interlocking, as described, the segmental plates D are placed outside the gibs C, so that the flanges of the gibs will project into the slots of the segmental plates, and the outer plates E are then driven lengthwise upon the cannon, so that the abutting flanges of the said outer plates will fit the transverse slots of the segmental plates. It is necessary that all the connected parts should fit very nicely, and the segments, gibs, segmental plates, and outer plates may be driven into position by hydraulic power or by any suitable means.

From the foregoing description it will be seen that a cannon of any desired capacity may be easily constructed, and the curvature of the various segmental parts composing a cannon is such as to give the cannon the desired bore and diameter. It will readily be seen that another series of segmental rings, gibs, segmental plates, and outer plates may be laid upon the cannon, and that its thickness may be built up to any extent, and that the various parts composing it are tied together in such a manner that it is practically formed of a single piece and is not likely to burst.

The inner segments B may be bolted, riveted, or otherwise fastened together, and the bore of the cannon may be rifled, if desired, in the ordinary manner.

Having thus fully described my invention, I claim as new and desire to secure by Letters Patent—

1. A cannon comprising a breech-block and a barrel composed of a series of segmental parts suitably locked together and keyed to the recessed breech-block, substantially as described.

2. A cannon comprising a breech-block, a series of segmental rings forming the bore of the cannon, the said segments having laterally-extending lugs on one side, corresponding recesses on the other, and circumferential slots on their outer surfaces, a series of segmental gibs having radial flanges to fit the slots of the segmental rings and to fit a corresponding recess in the breech-block, a series of segmental plates having slots upon their inner surfaces to receive the flanges of the gibs and having transverse slots upon their outer surfaces, and a series of outer plates having transverse slots upon their inner surfaces and having end flanges adapted to fit in the transverse slots of the segmental plates, substantially as described.

3. In a cannon, the combination of the inner segmental rings suitably fastened together and provided with slots upon their outer surfaces, the gibs having slots upon their outer and inner surfaces, and having radial flanges, as shown, the segmental plates having slots upon their inner surfaces to receive the flanges of the gibs, and having transverse slots upon their outer surfaces, the outer plates having transverse slots upon their inner surfaces, and having end flanges adapted to fit in the transverse slots of the segmental plates, and means for tying the above-mentioned parts to the breech-block, substantially as described.

4. The combination, with the inner segments tied together, as shown, the gibs attached thereto and provided with end flanges, as described, and the segmental plates and the outer plates surrounding the gibs, of the breech-block having a recess to receive the lugs of the segments, a recess to receive the flanges of the gibs, and a recess to receive the segmental plates and the outer plates, substantially as described.

A. R. DAVIS.

Witnesses:
N. J. ABBOTT,
JAS. H. WESTCOTT.